US009366689B2

(12) United States Patent
Booten et al.

(10) Patent No.: US 9,366,689 B2
(45) Date of Patent: Jun. 14, 2016

(54) SYSTEMS AND METHODS FOR THERMAL IMAGING TECHNIQUE FOR MEASURING MIXING OF FLUIDS

(71) Applicant: Alliance for Sustainable Energy, LLC, Golden, CO (US)

(72) Inventors: Charles Booten, Arvada, CO (US); Jeff Tomerlin, Denver, CO (US); Jon Winkler, Littleton, CO (US)

(73) Assignee: ALLIANCE FOR SUSTAINABLE ENERGY, LLC, Golden, CO (US)

( * ) Notice: Subject to any disclaimer, the term of this patent is extended or adjusted under 35 U.S.C. 154(b) by 210 days.

(21) Appl. No.: 14/224,302

(22) Filed: Mar. 25, 2014

(65) Prior Publication Data

US 2014/0290355 A1 Oct. 2, 2014

Related U.S. Application Data

(60) Provisional application No. 61/805,369, filed on Mar. 26, 2013.

(51) Int. Cl.
*G01P 5/10* (2006.01)

(52) U.S. Cl.
CPC .................................... *G01P 5/10* (2013.01)

(58) Field of Classification Search
CPC ........................................................ G01P 5/10
USPC ....................................................... 73/204.11
See application file for complete search history.

(56) References Cited

U.S. PATENT DOCUMENTS

2011/0308311 A1* 12/2011 Dalla Betta ........... G01F 1/6842
73/170.12
2014/0008536 A1* 1/2014 Prest ..................... G01J 5/0003
250/330

OTHER PUBLICATIONS

Winkler, et al., "Laboratory Performance Testing of Residential Window Air Conditioners," Technical Report, NREL/ TP-550-57617, Revised Jul. 2013.

* cited by examiner

*Primary Examiner* — Lisa Caputo
*Assistant Examiner* — Jamel Williams
(74) *Attorney, Agent, or Firm* — John C. Stolpa; Robert G. Pittelkow

(57) ABSTRACT

Systems and methods for thermal imaging for measuring mixing of fluids are provided. In one embodiment, a method for measuring mixing of gaseous fluids using thermal imaging comprises: positioning a thermal test medium parallel to a direction gaseous fluid flow from an outlet vent of a momentum source, wherein when the source is operating, the fluid flows across a surface of the medium; obtaining an ambient temperature value from a baseline thermal image of the surface; obtaining at least one operational thermal image of the surface when the fluid is flowing from the outlet vent across the surface, wherein the fluid has a temperature different than the ambient temperature; and calculating at least one temperature-difference fraction associated with at least a first position on the surface based on a difference between temperature measurements obtained from the at least one operational thermal image and the ambient temperature value.

20 Claims, 6 Drawing Sheets

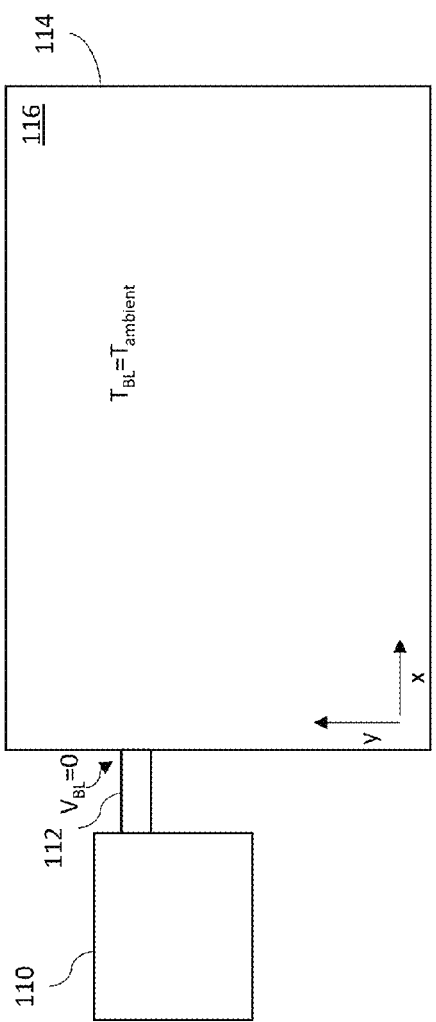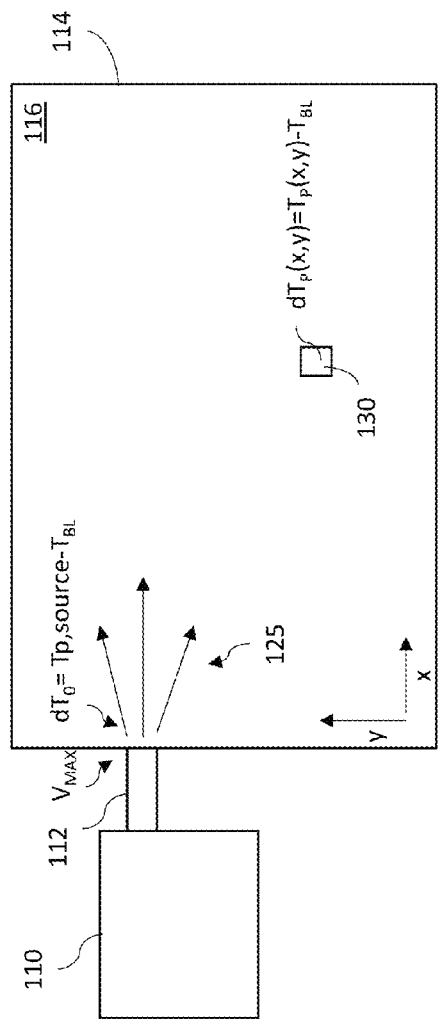

SYSTEMS AND METHODS FOR THERMAL IMAGING TECHNIQUE FOR MEASURING MIXING OF FLUIDS

CROSS-REFERENCE TO RELATED APPLICATIONS

This Application claims priority to, and the benefit of, U.S. Provisional Application No. 61/805,369, entitled "THERMAL IMAGING TECHNIQUE FOR MEASURING MIXING OF FLUIDS" filed on Mar. 26, 2013, which is incorporated herein by reference in its entirety.

CONTRACTUAL ORIGIN

The United States Government has rights in this invention under Contract No. DE-AC36-08GO28308 between United States Department of Energy and the Alliance for Sustainable Energy, LLC, the Manager and Operator of the National Renewable Energy Laboratory.

BACKGROUND

Existing techniques for measuring two dimensional velocity fields, such as Particle Image Velocimetry (PIV), require expensive and specialized equipment such as lasers, advanced optics and particle seeding of flows. The use of lasers in PIV requires specialized safety equipment and procedures, and the advanced optics requires precision alignments that add to the expenses of using the technique and hinders its use in field applications. The expenses result in large costs, significant setup time for each experiment and require a dedicated facility to operate. There are faster and cheaper techniques for measuring velocities such as pitot probes or hot wire anemometers, however, they only provide point measurements. If these instruments are used to obtain two dimensional flows they become prohibitively expensive and time consuming and have limited spatial resolution. Laser Doppler Velocimetry (LDV) is another technique that can provide high spatial resolution but it is also a point measurement technique and requires many of the same expensive equipment costs as PIV and is inadequate and extremely time consuming for obtaining two dimensional flows.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one embodiment, a method for measuring mixing of gaseous fluids using thermal imaging comprises: positioning a thermal test medium parallel to a direction of primary flow of a gaseous fluid from an outlet vent of a momentum source, wherein when the momentum source is operating, the gaseous fluid flows across a surface of the thermal test medium; obtaining an ambient temperature value from a baseline thermal image of the surface when no gaseous fluid is flowing from the outlet vent; obtaining at least one operational thermal image of the surface when the gaseous fluid is flowing from the outlet vent across the surface, wherein the gaseous fluid has a temperature different than the ambient temperature; and calculating at least one temperature-difference fraction associated with at least a first position on the surface based on a difference between temperature measurements obtained from the at least one operational thermal image and the ambient temperature value.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

FIGS. 2A-2C are diagrams illustrating measuring dispersion speeds of gaseous fluids of one embodiment of the present disclosure.

DETAILED DESCRIPTION

Figure 1:
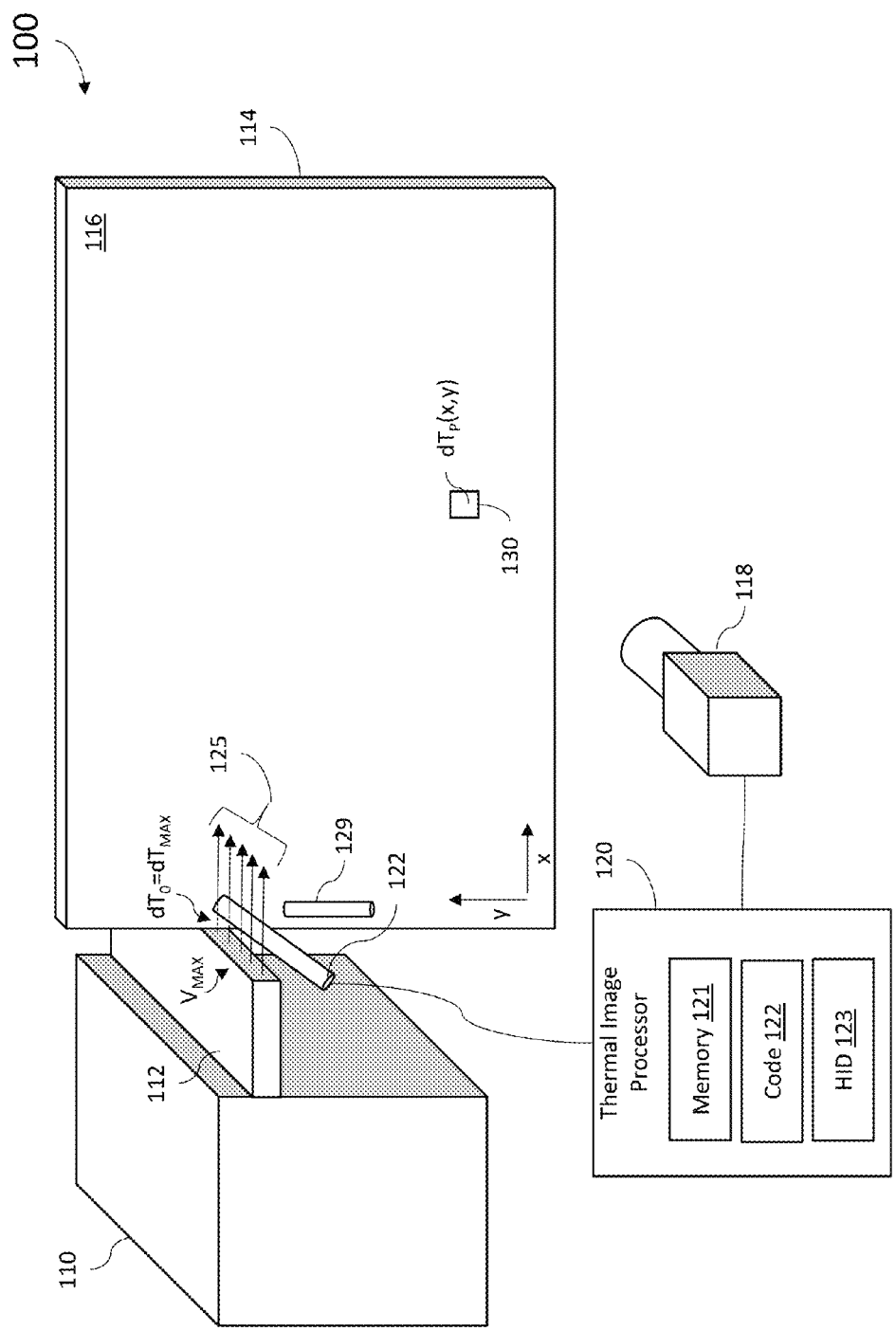
FIG. 1 is a diagram illustrating a system for measuring mixing of gaseous fluids using thermal imaging of one embodiment of the present disclosure.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present disclosure provide system and methods for measuring the speed of a gaseous fluid using thermal imaging. More specifically, provided initial ambient temperature conditions, the velocity magnitude of a gaseous fluid flowing into an ambient gaseous fluid can be obtained through thermal imaging of a thermal test medium inserted into the gaseous fluid flow. Measured deviations in temperature on the thermal test medium from the initial ambient temperature may be used as a proxy for determining the dispersion speed of the gaseous fluid immediately proximate to any point on the thermal test medium.

FIG. 1 is a diagram illustrating a system for measuring gaseous fluid velocity of one embodiment of the present disclosure. FIG. 1 comprises a momentum source 110 having at least one output vent 112 from which a primary flow of gaseous fluid 125 (such as air, for example) flows. A thermal test medium 114 is positioned within the primary flow of gaseous fluid 125. Thermal test medium 114 comprises an object (such as a test board) having a surface 116 running parallel to the flow. A thermal imaging device 118 is positioned with its field of view facing the surface 116 of thermal test medium 114 so as to be able to take thermal images of the surface 116 which are transmitted to thermal image processor 120. System 100 further comprises at least one velocity probe 122 (such as an anemometer, for example) also coupled to processor 120 and positioned at output vent 112 to measure the velocity of the gaseous fluid 125 flowing from momentum source 110. In various embodiments, momentum source 110 may comprise an air conditioning system, fan, compressed air source, or any other device capable of supplying a flow of gaseous fluid 125 from vent 112 at a constant rate and temperature. In one embodiment, processor 120 includes a memory 121 comprising a non-transient data storage device which store code 122 which is executed by processor 120 to realize the processes, calculations, algorithms, functions, and other elements described with respect to the embodiments described herein, and a human-interface device (HID) 123 for displaying results from executing said code.

The analysis domain on which the thermal imaging will be performed comprises the surface 116 and the fluid 125 from the momentum source 110. This analysis involves the solution of a conjugate heat transfer problem where one boundary condition and the problem solution are known and the remaining boundary condition (gaseous fluid temperature next to surface 116) must be iteratively solved for. Conduction, radiation and convection occur simultaneously between the fluid and the surface 116 of thermal test medium 114 and therefore cannot be treated sequentially.

The local dispersion speed of fluid 125 at any point in the analysis domain can be determined from the infrared images of surface 116 using the following assumptions: first, the only momentum source affecting the analysis domain is from the outlet vent 112 of the momentum source 110; second, there is a uniform ambient temperature ($T_{ambient}$) over the entirety of surface 116 prior to operating momentum source 110; and third, the Peclet Number, Pe (discussed below) is large such that momentum dispersion of the fluid 125 dominates over any thermal diffusion. Fourth, if concentration of the fluid is important, the Lewis number should be approximately one such that mass and thermal diffusion occur at approximately the same rate; this allows for thermal diffusion to be used as a proxy for mass diffusion. Under these assumptions, a measured temperature difference between a baseline reference image obtained prior to operation of momentum source 110 and operating images can be used to estimate a fraction of fluid 125 at any location in the analysis domain that is from the outlet vent 112. Then, given a measured velocity of fluid 125 taken at the outlet vent 112 by velocity probe 122, a local velocity can be determined at any point in the analysis domain.

For example, referring to FIG. 2A, in one embodiment, a baseline thermal image is taken of surface 116 with the momentum source 110 shut off so that baseline fluid velocity, $V_{BL}$ from outlet vent 112 is zero. The baseline temperature, $T_{BL}$, of every point on the surface 116 and the surrounding ambient gaseous fluid at steady state is defined to be the $T_{ambient}$ measured via the baseline thermal image. Referring next to FIG. 2B, momentum source 110 is operated to produce a flow of fluid 125 from outlet vent 112 across surface 116. The maximum flow velocity of fluid 125 within the analysis domain will occur at the outlet vent 112 so that the flow from outlet vent 112 measured by velocity probe 122 may be defined as $V_{MAX}$. Further, momentum source 110 is operated to supply fluid 125 from outlet vent 112 at a temperature differential, $dT_0$, from the baseline $T_{BL}$ which can be expressed as $dT_0=Tp,source-T_{BL}$. An operational thermal image of surface 116 is then taken with momentum source 110 in operation. If the surface 116 is divided into a grid of elements each having a set of coordinates expressible by x and y, then at any given position (x,y) on surface 116, a differential temperature $dT_p(x,y)$ can be defined by $dT_p(x,y)=T_p(x,y)-T_{BL}$, where $T_p(x,y)$ is the temperature of surface 116 at position (x,y) as determined from the operational thermal image. In one embodiment, the baseline thermal image and one or more operational thermal images captured by thermal imaging device 118 are stored by processor 120 from which the differential temperature $dT_p(x,y)$ for each position (x,y) on surface 116 is calculated by processor 120.

Figure 2C:
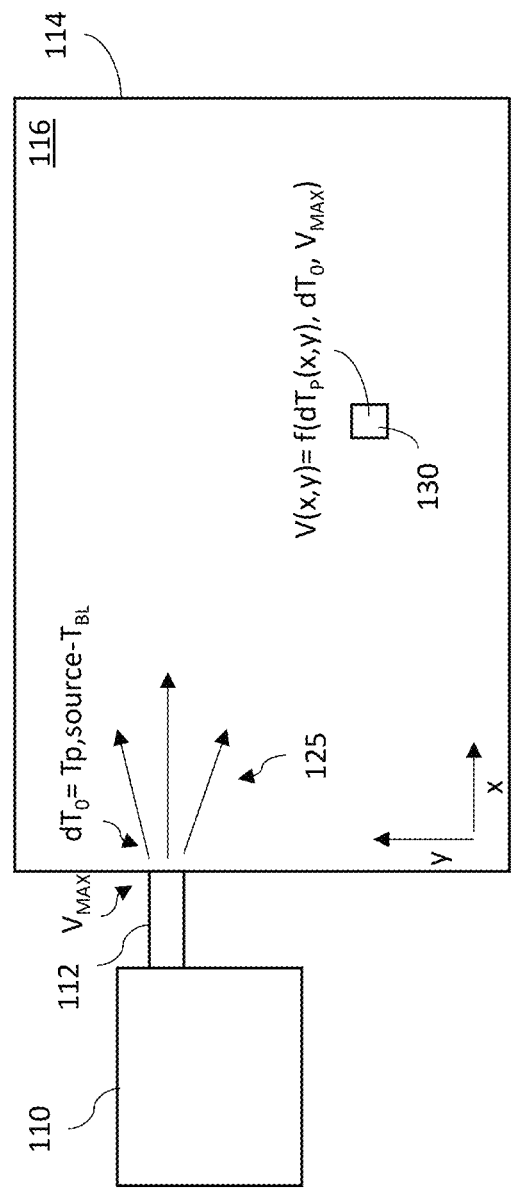

If the only flow momentum and temperature changes occurring in the analysis domain come from the fluid 125 exiting from outlet vent 112, then there is a direct relation between momentum and temperature. That is, as illustrated in FIG. 2C, the dispersion speed, V, of fluid 125 flowing across any position (x,y) of surface 116 (such as shown at 130) is determined by processor 120 as a function expressible as $V(x,y)=dT_p(x,y), dT_0, V_{MAX})$.

The non-dimensional parameter that characterizes this relationship is the Peclet Number, which can be expressed by Pe=Re·Pr, where the Prandtl number, Pr, has a value of approximately 0.7 for diatomic gases such as air near room temperature (72 deg. F.). Heavier gases have higher Pr values, but the actually value is not critical as long as the Pe value is large (>>1). The Reynolds number, Re, is defined as Re=V.L/η which uses a velocity, V, a characteristic dimension, L, and the kinematic viscosity of the gaseous fluid, η, for Re to be determined. A large Re means that momentum dispersion of the fluid 125 across surface 116 dominates over momentum diffusion of the fluid, which is the desired condition for performing the analysis discussed herein. The Prandtl Number, Pr, relates momentum diffusion to thermal diffusion so that a Pr which is large tends to increase Pe which is the desired condition for performing this analysis. When the Pe is large (>>1) over the domain, and the rest of the previously mentioned conditions are assumed true, then the mass and enthalpy fractions from the momentum source 110 outlet vent 112 are approximately identical to each other throughout the analysis domain.

It should be appreciated upon reading this disclosure that the enthalpy fraction associated with the analysis domain will be the same as the temperature fraction when the specific heat, cp, of gaseous fluid 125 as a dry fluid is constant (which is a valid assumption over small temperature ranges) and the Lewis Number, Le, is approximately equal to 1 (meaning the water vapor diffusion rate from fluid 125 is the same as the thermal diffusion rate, which may also be assumed). Therefore, for this analysis, it can be assumed that the humidity from the outlet vent 112 diffuses across surface 116 at approximately the same rate as temperature diffusion. Since the value of Pe is large (>>1) and dispersion dominates both of diffusion effects, it can be assumed that mass, enthalpy and temperature all move at the same rate within the measured analysis domain.

Given the above, the mass fraction of fluid 125 originating from the momentum source 110 at any position (x,y) in the domain is well approximated by a measured temperature-difference fraction, which can be defined as $$dT_{Fraction}(x, y) = \frac{dT_P(x, y)}{dT_{Max}}$$

where $dT_p(x,y)$ is the temperature differential measured at position (x,y) on the surface 116 and $dT_{Max}$ is the maximum measured temperature difference between the surface 116 and ambient temperature, which will occur at the outlet vent 112. The dispersion speed equation, eq. 1, from above can then be defined as:

$$V(x,y) = dT_{Fraction}(x,y) V_{Max}$$

For example, in one embodiment, V(x,y) can be obtained from the equation:

$$V(x, y) = \frac{dT_p(x, y)}{dT_0} \cdot V_{MAX} \quad \text{(eq. 1)}$$

so that where $V_{MAX}$ as determined from velocity probe 122 is measured as 10 meters/sec, $dT_0$ and $dT_p(x,y)$ as measured by the operational thermal image are measured as dT0=10° C. and $dT_p(x,y)$=3° C., then $$V(x, y) = \frac{3° C.}{10° C.} \cdot 10\frac{m}{s} = 3\frac{m}{s}$$

Although thermal imaging device 118 captures the surface temperatures of surface 116, it should be noted that these measured temperatures are a function of, but not equal to the temperature of the gaseous fluid 125 flowing across and in contact with it. As such, a correction factor may be applied where the measured surface 116 temperatures are used to back out the temperature of the fluid 125 at every location in the captured operational images. When the correction factor is applied, the measured temperature-difference fraction can be defined as $$dT_{Fraction}(x, y) = \frac{dT_{gas,local}(x, y)}{dT_{gas,Max}}$$

where $dT_{gas,local}(x,y)$ is calculated from $dT_p(x,y)$ and $dT_{gas,Max}$ is calculated from $dT_{Max}$ using an iterative algorithm from solving an inverse heat conduction problem as described below.

Obtaining the correction to determine fluid 125 temperatures from the surface 116 temperatures involves a conjugate heat transfer domain where conduction, radiation and convection occur simultaneously between the fluid 125 and the surface 116 and therefore cannot be treated sequentially. The solution to this conjugate heat transfer problem is obtainable and many of the boundary conditions and related quantities, such as radiation to ambient temperature, and convective heat transfer from the air to the thermal test medium can be approximated. For example, in one embodiment, an iterative algorithm for solving an inverse heat conduction problem can be applied by processor 120 to the measured $dT_p(x,y)$ values to determine what local gaseous fluid temperature $dT_{gas,local}(x,y)$ produced the measured temperatures across the surface 116. Backing out the temperature of the fluid to determine local gaseous fluid temperatures $dT_{gas,local}(x,y)$ will provide better accuracy than calculating the temperature-difference fraction directly from the surface temperatures $dT_p(x,y)$. However, where the difference in temperature between the thermal test medium surface and the local air temperature is small, and having a reduced accuracy is acceptable, the iterative algorithm for solving the inverse heat conduction problem may be omitted to simplify calculations.

In one embodiment, a conjugate heal transfer model is applied that uses a finite volume discretization and assumes that the thermal test medium 114 is adiabatic in the middle of its thickness. This is a good approximation where the thermal test medium 114 is thin and the flow on either side is approximately equal in temperature and velocity and where ambient temperature is approximately constant over the entire field of view the thermal imaging device 118 has of the surface 116. In some implementations, the thermal test medium 114 may be considered to be two elements thick, with one element accounting for the surface material of the surface 116 and one element accounting for the inner core of the thermal test medium 114. The inner core element can be assumed to be half the thickness of the actual core of thermal test medium 114, which allows for the adiabatic assumption at the side of the element representing the center of the actual surface 116.

In one embodiment, a non-corrected velocity V(x,y) calculated directly from temperatures $dT_p(x,y)$ may be applied to the equation Re=V.L/η to obtain an estimate of the Reynolds number for position (x,y), as well as a Peclet Number, Pe. A convective heat transfer coefficient, $h_{cv}$, for any position (x,y) on the surface 116 can then be calculated from:

$$h_{CV}(x, y) = \frac{Nu(x, y) \cdot k_{air}}{L}$$

where for forced convection, the Nusselt number, Nu is generally a function of the Reynolds number and the Prandtl number, or Nu=f(Re, Pr). Empirical correlations for a wide variety of geometries are available to readily obtain the Nusselt number. For embodiments where surface 116 can be characterized as a laminar boundary layer across a flat plane, $Nu=0.664 Re^{0.5} Pr^{0.33}$ may be used. A convective heat transfer coefficient, $h_{cv}(x,y)$ can then be related to the heat transfer occurring at any position (x,y) on the surface 116 by:

$$\dot{Q}(x,y) = h_{cv} A(T_p(x,y) - T_{gas,local}(x,y))$$

where A is the surface area of the surface 116 and $T_{gas,local}(x,y)$ is the gaseous fluid temperature proximate to the position (x,y) on the surface 116. To then solve the conjugate heat transfer problem, an initial guess, $T_p^{assumed}(x,y)$, can be made for $T_{gas,local}(x,y)$. An iterative algorithm which can then be applied by processor 120 is:

$$T_{gas,local}(x,y) = T_{gas,local}^{iteration-1}(x,y) - C(T_p(x,y) - T_p^{assumed}(x,y))$$

where C is the heat capacity f the gaseous fluid (e.g., air). The $T_p^{assumed}(x,y)$ is used for the first iteration. Then the updated $T_{gas,local}(x,y)$ is used along with the other boundary conditions to solve for a $T_p(x,y,i)$ during the next iteration, i. For iteration i+1, $T_p(x,y,i)$ is subtracted from the $T_p(x,y)$ valued measured from the image of surface 116. This iteration continues until $T_p(x,y)$ is sufficiently converged.

The measured temperature-difference fraction can also be utilized as the basis for calculating a mass fraction of fluid 125 which has been dispersed to position (x,y). That is, referring back to FIG. 2C, if, for example, fluid 125 comprises 100% pure nitrogen ($N_2$), and the initial ambient gaseous fluid is air, then the total concentration of nitrogen present at position (x,y) can also be determined as a function of $dT_{Fraction}(x,y)$. For example, assuming fluid 125 comprises 100% pure nitrogen ($N_2$) flowing from outlet vent 112. The corrected local air temperatures for $dT_{gas,0}$ and $dT_{gas,local}$ derived from measurements of the operational thermal image are $dT_{gas,0}$=10° C. and $dT_{gas,local}(x,y)$=3° C. Then $$dT_{Fraction}(x, y) = \frac{3° C.}{10° C.} = 0.3$$

meaning that 30% of the fluid at position (x,y) comprises nitrogen flowing from outlet vent 112 and 70% of the fluid comprises the original air (which is 78% nitrogen by volume). Therefore the total concentration of nitrogen at position (x,y) is 84.6%.

In one embodiment, the system 100 may further include an apparatus 129 for injecting neutrally buoyant particles into the gaseous fluid flowing from the outlet vent of the momentum source. This can be useful, for example, at the outlet vent 112 of the momentum source 110 for measuring flow velocity because the velocity can be measured with the thermal imaging device 118 without the need for velocity probe 122. By capturing a series of images revealing a direction of travel of the particles, a velocity vector for the gaseous fluid at a position (x,y) can be determined by correlating a measured dispersion speed of the gaseous fluid at position (x,y) and the direction of travel observed from the particles. The particle seeding produced by apparatus 129 may comprise, for example, smoke, vapor, bubbles, or some other neutrally buoyant type of particle. To support such embodiments, for some implementations, the thermal imaging device 118 includes the ability to capture visible spectrum as well as infra-red images. However, capturing in the visible spectrum may not be necessary if the injected particles have a different infra-red signature than the flowing gaseous fluid 125.

In one alternate implementation of system 100, the gaseous fluid 125 provided by the momentum source 100 can be seeded by an alternating pattern of temperature changes (for example, alternating between two or more temperature states). In one embodiment, such a pattern of temperature changes is controlled by processor 120. Thermal imaging device 118 takes operating thermal images such that multiple temperature pulses are within the field of view and the series of images are analyzed by processor 120 to determine gradient changes and how resulting temperature gradients propagate and from that the velocity magnitude and direction can be determined.

Figure 3A:
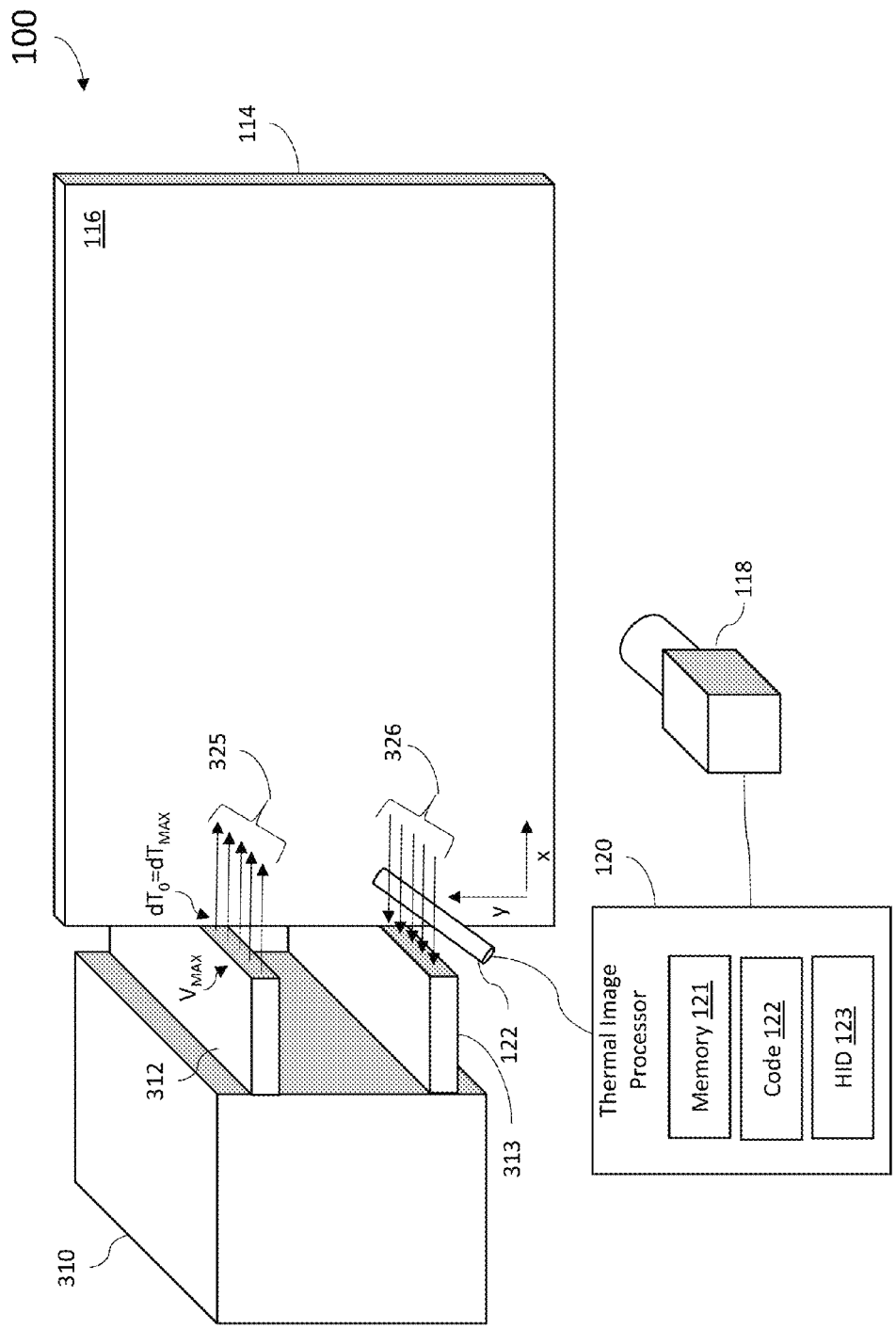
FIGS. 3A and 3B are diagrams illustrating an embodiment of the present disclosure for measuring recirculation.
Figure 3B:
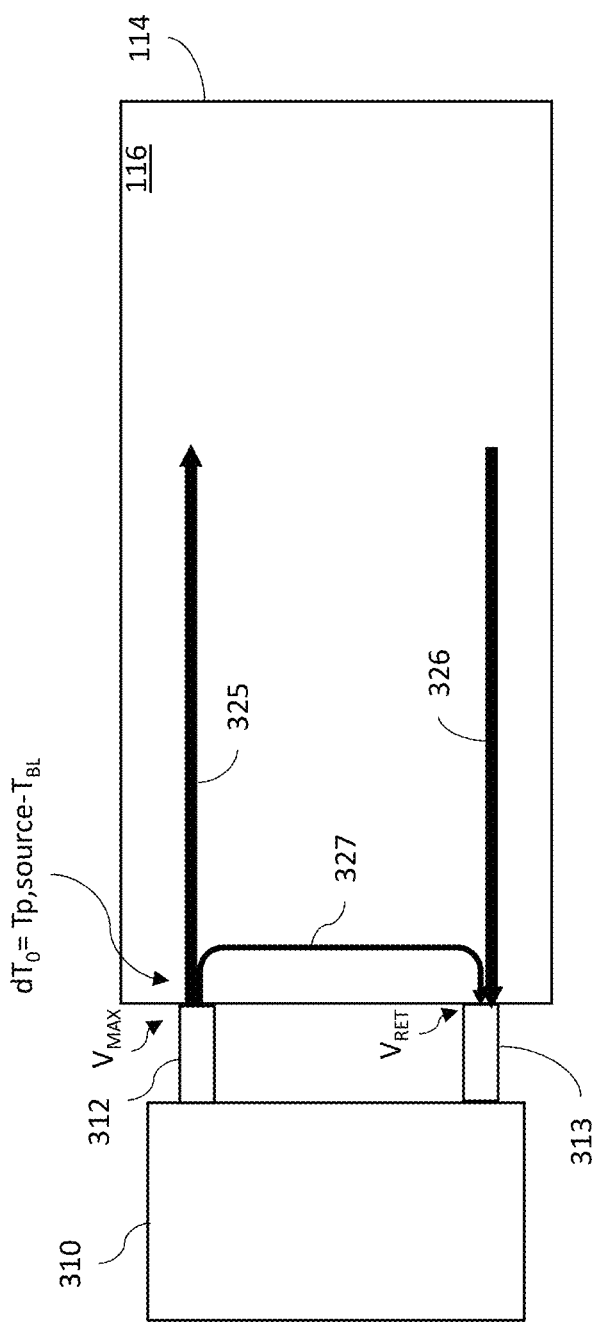

FIGS. 3A and 3B illustrate yet another embodiment where system 100 is utilized to measure recirculation between outlet and inlet vents. In FIGS. 3A and 3B, the momentum source 310 comprises both an outlet vent 312 and an inlet vent 313. For example, in one implementation, momentum source 310 comprises an air conditioning unit which supplies cold air 325 from outlet vent 312 and receives relatively warmer return air 326 through inlet vent 313. In this embodiment, thermal test medium 114 is positioned within the flow of both the cold air 325 and the return air with surface 116 running parallel to the two flows. As illustrated in FIG. 3B, recirculation flow 327 represents an inefficiency in the design of the momentum source 310 since energy has been expended to produce this flow of cold air, but instead of cooling a space, it instead is being immediately sucked back into intake vent 313. A recirculation fraction representing this inefficiency can be calculated by processor 120 by taking baseline and operational thermal images of surface 116 as described above using FIGS. 2A-2C and using $T_{air,local}(x,y)$ measurements to derive the temperature differential values used to calculate the mass fraction.

More specifically, once actual local air temperatures are known, a recirculation fraction is obtained by multiplying the mass fraction of air from the outlet vent 312, which is equal to $$dT_{Fraction}(x, y) = \frac{dT_{air,local}(x, y)}{dT_{air,Max}},$$

by a measured velocity of the return air 326 at the inlet vent 313, $V_{RET}(x,y)$, and summing these across an inlet profile:

$$R_{Fraction} = \Sigma dT_{Fraction}(x,y) \cdot V_{RET}(x,y)$$

The above recirculation fraction could be used, for example, for the evaporator side of a window air conditioning unit having only a single inlet vent 313. The measurement $V_{RET}(x,y)$ may be obtained in one embodiment by locating velocity probe 122 at the inlet vent 313 as shown in FIG. 3A. For a momentum source 110 where inlet vent 313 comprises multiple vents, the calculation may include a summation over each inlet vent and then scaling of the results based on the relative area of each vent. For example, where inlet vent 313 comprises two side vents one on top (which may be the case for the condenser side of a window air conditioning unit, for example), the recirculation fraction can be calculated from:

$$R_{Fraction} = \left(\sum_{Top} dT_{Fraction}(x, y) \cdot V_{RET}(x, y)\right) \frac{Area_{Top}}{Area_{Sides}} + \left(\sum_{Sides} dT_{Fraction}(x, y) \cdot V_{RET}(x, y)\right)\left(1 - \frac{Area_{Top}}{Area_{Sides}}\right)$$

A wide range of materials may be employed to realize thermal test medium 114 as long as the spectral emissivity of the surface 116 is known and is within the infra-red spectrum being measured by thermal imaging device 118. For example, in one alternate embodiment, as opposed to surface 116 being a solid and continuous surface, thermal test medium 114 may be comprised of a mesh or screen material that imposes less interference with airflow having components normal to surface 116.

Figure 4:
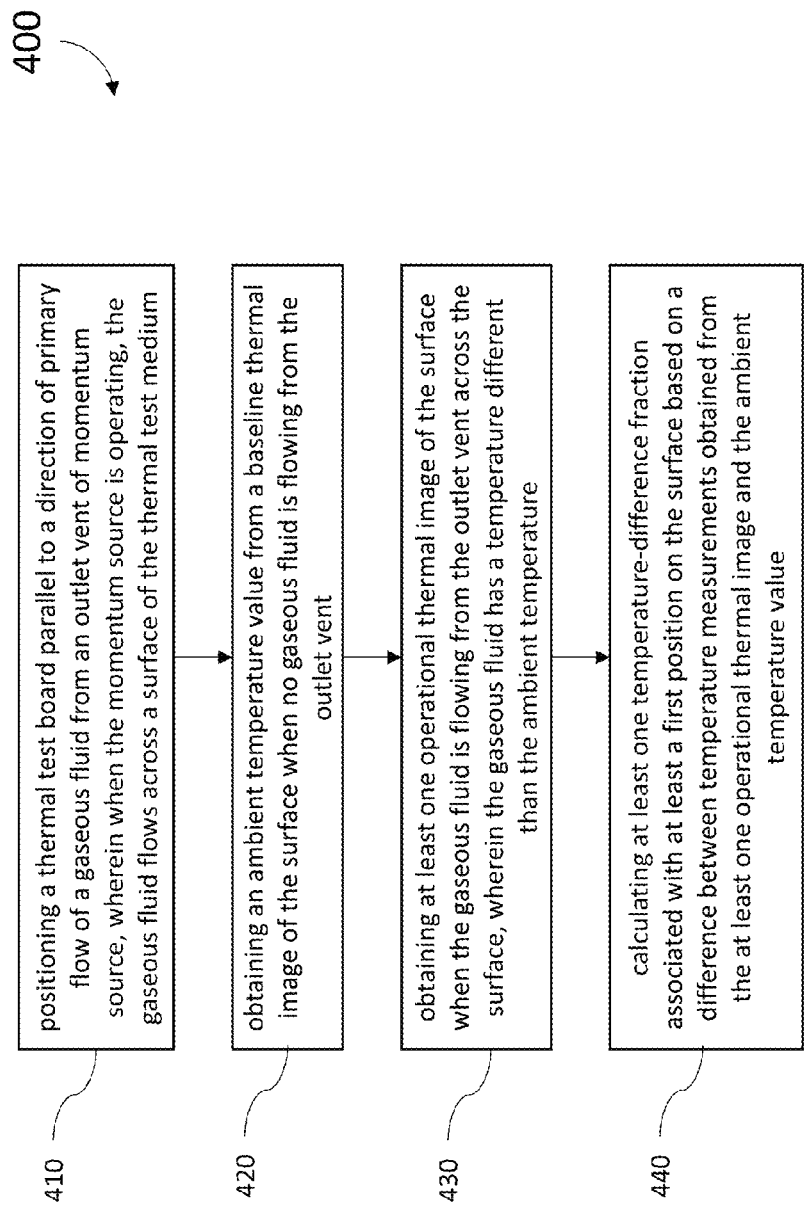
FIG. 4 is a flow chart illustrating a method embodiment for measuring mixing of gaseous fluids using thermal imaging of one embodiment of the present disclosure.

FIG. 4 is a flow chart illustrating a method 400 for measuring mixing of gaseous fluids using thermal imaging. It is expressly noted that the method 400 may be implemented by system 100 or in conjunction with implementing any of the embodiments described above. As such, further embodiments of the present disclosure include the combination of method 400 with any of the other embodiments and alternate embodiments described herein. The method begins at 410 with positioning a thermal test medium parallel to a direction of primary flow of a gaseous fluid from an outlet vent of momentum source, wherein when the momentum source is operating, the gaseous fluid flows across a surface of the thermal test medium.

The method proceeds to 420 with obtaining an ambient temperature value from a baseline thermal image of the surface when no gaseous fluid is flowing from the outlet vent. For example, referring to FIG. 2A, in one embodiment, a baseline thermal image is taken of a surface with the momentum source shut off so that baseline fluid velocity, $V_{BL}$ from the outlet vent is zero. The baseline temperature, $T_{BL}$, of every point on the surface and the surrounding ambient gaseous fluid at steady state is defined to be the $T_{ambient}$ measured via the baseline thermal image.

The method proceeds to 430 with obtaining at least one operational thermal image of the surface when the gaseous fluid is flowing from the outlet vent across the surface, wherein the gaseous fluid has a temperature different than the ambient temperature. As previously discussed with respect to FIG. 2B, the momentum source is operated to produce a flow of fluid from the outlet vent and across the surface. The maximum flow velocity of the fluid within the analysis domain will occur at the outlet vent so that the flow from the outlet vent (for example, as measured by a velocity probe)

may be defined as $V_{MAX}$. Further, the momentum source is operated to supply the fluid from the outlet vent at a temperature differential, $dT_0$, from the baseline $T_{BL}$ which can be expressed as $dT_0=Tp,source-T_{BL}$. An operational thermal image of the surface is then taken with the momentum source in operation. Dividing the surface into a grid of elements each representing a given position (x,y) on the surface, a differential temperature $dT_p(x,y)$ can be defined by $dT_p(x,y)=T_p(x,y)-T_{BL}$, where $T_p(x,y)$ is the temperature of the surface at position (x,y) as determined from the operational thermal image. Accordingly, the method proceeds to 440 with calculating at least one temperature-difference fraction associated with at least a first position on the surface based on a difference between temperature measurements obtained from the at least one operational thermal image and the ambient temperature value. In one embodiment, the method at 440 comprises calculating the at least one temperature-difference fraction from the equation:

$$dT_{Fraction}(x, y) = \frac{dT_P(x, y)}{dT_{Max}}$$

As explained above, once the temperature-difference fraction is determined, a plurality of factors associated with mixing of the injected and ambient fluid may be obtained such as but not limited to dispersion speeds, mass fractions (e.g., concentration percentages), and recirculation fractions. Also as mentioned above, the thermal imaging device captures the surface temperatures of the surface of the test medium, which are a function of, but not equal to the temperature of the fluid flowing across it. Therefore, a correction factor may be applied where the measured surface temperatures are used to back out the temperature of the fluid at every location in the captured operational images. In one embodiment, the method may also comprise performing an iterative algorithm solving an inverse heat conduction problem that determines a local air temperature proximate to the first position on the surface. Backing out the temperature of the fluid will provide better accuracy than calculating the temperature-difference fraction directly from the surface temperatures. However, where the difference in temperature between the thermal test medium surface and the local air temperature is small and the reduced accuracy is acceptable, the iterative algorithm for solving the inverse heat conduction problem may be omitted to simplify calculations.

Additional example applications which may utilize system 100, method 400 or any of the embodiments described above include manufacturing processes and applications where the injection of a first gaseous fluid into an ambient fluid can now be monitored using thermal imaging rather than sensors. Other applications include, for example, evaluating the distribution of air vents within a vehicle cabin by monitoring dispersion of air flowing from the vents, or in-situ evaluation of the air flow of an air curtain installed at the entrance of a building. Further, the method 400 may be implemented in multiple iterations with the thermal test medium in different positions within the flow of gaseous fluid along the outlet vent with the results interpolated to provide a quasi-three-dimensional field of fluid flow.

In various alternative embodiments, any of the systems or methods described throughout this disclosure may be implemented on one or more computer systems comprising a processor (such as processor 120) executing code to realize the processes, calculations, algorithms, functions, and other elements described with respect to the Figures, said code stored on a non-transient data storage device. Therefore other embodiments of the present disclosure include program instructions resident on computer readable media which when implemented by such computer systems, enable them to implement any of the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope.

What is claimed is:

1. A method for measuring mixing of gaseous fluids using thermal imaging, the method comprising:

positioning a thermal test medium parallel to a direction of primary flow of a gaseous fluid from an outlet vent of a momentum source, wherein when the momentum source is operating, the gaseous fluid flows across a surface of the thermal test medium;

obtaining an ambient temperature value from a baseline thermal image of the surface when no gaseous fluid is flowing from the outlet vent;

obtaining at least one operational thermal image of the surface when the gaseous fluid is flowing from the outlet vent across the surface, wherein the gaseous fluid has a temperature different than the ambient temperature; and calculating at least one temperature-difference fraction associated with at least a first position on the surface based on a difference between temperature measurements obtained from the at least one operational thermal image and the ambient temperature value.

2. The method of claim 1, further comprising:

measuring a speed of the gaseous fluid at the outlet vent; and calculating a dispersion speed of the gaseous fluid at the first position from a function using the speed of the gaseous fluid at the outlet vent and the temperature-difference fraction.

3. The method of claim 2, further comprising:

injecting particles into the gaseous fluid flowing from the outlet vent; and calculating a velocity vector for the gaseous fluid at the first position by correlating the dispersion speed of the gaseous fluid at the first position and a direction of travel observed from the particles.

4. The method of claim 1, wherein calculating the at least one temperature-difference fraction further comprises calculating:

$$dT_{Fraction}(x, y) = \frac{dT_P(x, y)}{dT_{Max}}$$

where $dT_p(x, y)$ is determined based on a temperature differential at position (x,y) measured from the at least one operational thermal image and the ambient temperature; and where $dT_{Max}$ is determined based on a temperature differential at the outlet vent measured from the at least one operational thermal image and the ambient temperature.

5. The method of claim 1, wherein calculating the at least one temperature-difference fraction further comprises calculating:

$$dT_{Fraction}(x, y) = \frac{dT_{gas,local}(x, y)}{dT_{gas,Max}}$$

where $dT_{gas,local}(x, y)$ is determined based on a temperature differential at position (x,y) measured from the at least one operational thermal image and the ambient temperature and further based on performing an iterative algorithm solving an inverse heat conduction problem that determines a local air temperature proximate to position (x,y) on the surface; and where $dT_{gas,Max}$ is determined based on a temperature differential at the outlet vent measured from the at least one operational thermal image and the ambient temperature and further based on performing the iterative algorithm to determine a local air temperature proximate to the outlet vent.

6. The method of claim 1, further comprising calculating a mass fraction of the gaseous fluid present at the first position as a function of the at least one temperature-difference fraction.

7. The method of claim 1, wherein the thermal test medium is further positioned within a return flow into the momentum source and where the surface is further running parallel to the return flow, the method further comprising:
  measuring a speed of the return flow at an inlet vent into the momentum source; and
  calculating a recirculation fraction at the inlet vent from a function of the temperature-difference fraction and the speed of the return flow at the inlet vent.

8. The method of claim 1, wherein either the surface of the thermal test medium comprises either a continuous surface, or thermal test medium comprises a mesh material.

9. The method of claim 1, wherein calculating the at least one temperature-difference fraction further comprises:
  performing an iterative algorithm solving an inverse heat conduction problem that determines a local air temperature proximate to the first position on the surface.

10. The method of claim 1, wherein the momentum source comprises one of an air conditioning system, a fan, or a compressed air source.

11. A system for measuring mixing of gaseous fluids using thermal imaging, the system comprising:
  a momentum source having at least one output vent from which a gaseous fluid flows;
  a thermal test medium positioned within a flow of the gaseous fluid and having a surface running parallel to the primary direction of flow; and
  a thermal imaging device positioned take thermal images of the surface, the thermal imaging device coupled to a processor;
  wherein the processor obtains at least one operational thermal image of the surface when the gaseous fluid is flowing from the outlet vent across the surface, wherein the gaseous fluid has a temperature different than an ambient temperature value for the surface measured when no gaseous fluid is flowing from the outlet vent; and
  wherein the processor calculates at least one temperature-difference fraction associated with at least a first position on the surface based on a difference between temperature measurements obtained from the at least one operational thermal image and the ambient temperature value.

12. The system of claim 11, further comprising:
  at least one velocity probe positioned at the output vent, the at least one velocity probe coupled to the processor;
  wherein the processor calculates a dispersion speed of the gaseous fluid at the first position from a function of the temperature-difference fraction and a speed of the gaseous fluid at the outlet vent as measured by the at least one velocity probe.

13. The system of claim 12, further comprising:
  an apparatus configured to inject particles into the gaseous fluid at the outlet vent; and
  wherein the processor calculates a velocity vector for the gaseous fluid at the first position by correlating the dispersion speed of the gaseous fluid at the first position and a direction of travel observed from the particles.

14. The system of claim 11, wherein the processor calculates the at least one temperature-difference fraction based on the equation:

$$dT_{Fraction}(x, y) = \frac{dT_P(x, y)}{dT_{Max}}$$

where $dT_p(x, y)$ is determined based on a temperature differential at position (x,y) measured from the at least one operational thermal image and the ambient temperature; and where $dT_{Max}$ is determined based on a temperature differential at the outlet vent measured from the at least one operational thermal image and the ambient temperature.

15. The system of claim 11, wherein the processor calculates the at least one temperature-difference fraction based on the equation:

$$dT_{Fraction}(x, y) = \frac{dT_{gas,local}(x, y)}{dT_{gas,Max}}$$

where $dT_{gas,local}(x, y)$ is determined based on a temperature differential at position (x,y) measured from the at least one operational thermal image and the ambient temperature and further based on an iterative algorithm that solves an inverse heat conduction problem that determines a local air temperature proximate to position (x,y) on the surface; and where $dT_{gas,Max}$ is determined based on a temperature differential at the outlet vent measured from the at least one operational thermal image and the ambient temperature and further based on an iterative algorithm that determines a local air temperature proximate to the outlet vent.

16. The system of claim 11, further comprising:
an inlet vent providing a return flow to the momentum source, wherein the thermal test medium is further positioned within the return flow and where the surface is further running parallel to the return flow; and
at least one velocity probe positioned at the inlet vent, the at least one velocity probe coupled to the processor;
wherein the processor calculates a recirculation fraction at the inlet vent from a function the temperature-difference fraction and a speed of the return flow at the inlet vent as measured by the at least one velocity probe.

17. The system of claim 11, wherein the processor calculates a mass fraction of the gaseous fluid present at the first position as a function of the at least one temperature-difference fraction.

18. The system of claim 11, wherein the processor calculates the at least one temperature-difference fraction further based on an iterative algorithm solving an inverse heat conduction problem that determines a local air temperature proximate to the first position on the surface.

19. The system of claim 11, wherein either the surface of the thermal test medium comprises either a continuous surface, or thermal test medium comprises a mesh material.

20. The system of claim 11, wherein the momentum source comprises one of an air conditioning system, a fan, or a compressed air source.

\* \* \* \* \*